S. D. COREY.
HEADLIGHT SHIELD.
APPLICATION FILED SEPT. 5, 1917.

1,279,991.

Patented Sept. 24, 1918.

Inventor
S. D. Corey.

By Victor J. Evans
Attorney

Witness

UNITED STATES PATENT OFFICE.

SYLVESTER D. COREY, OF NEW YORK, N. Y.

HEADLIGHT-SHIELD.

1,279,991.       Specification of Letters Patent.       Patented Sept. 24, 1918.

Application filed September 5, 1917. Serial No. 189,856.

*To all whom it may concern:*

Be it known that I, SYLVESTER D. COREY, a citizen of the United States of America, residing at New York, in the county of and State of New York, have invented new and useful Improvements in Headlight-Shields, of which the following is a specification.

This invention relates to shields for automobile head lights and has for its principal object the provision of a shield which can be readily attached to a head light whereby the rays will be scattered and projected downwardly upon the roadway immediately in front of the vehicle in order to prevent the blinding of the driver's of oncoming vehicles and pedestrians with the resulting accidents.

Another object of the invention is the provision of a shield or hood of the character described which is provided with a plurality of reflecting surfaces which scatter and distribute the rays upon the roadway a sufficient distance in advance of the machine to assure a clear vision thereof.

Another object of the invention is the provision of a shield of the class described which is provided with a hood extending therefrom having means located therein and co-acting therewith to obstruct the forward and upward projection of the light rays and cause the same to be projected in a downward and outward direction from the sides of the hood whereby to augment a light action of the lamp on the roadway immediately in front of the vehicle.

Another object of the invention is the provision of a shield of the class described which is of simple construction, inexpensive to manufacture and which may be quickly and easily applied to or detached from the headlight when desired.

With these and other objects in view, the invention resides in the novel construction, combination and arrangement of parts fully described in the following specification, particularly pointed out in the appended claim and illustrated in the accompanying drawings, of which—

Figure 1:
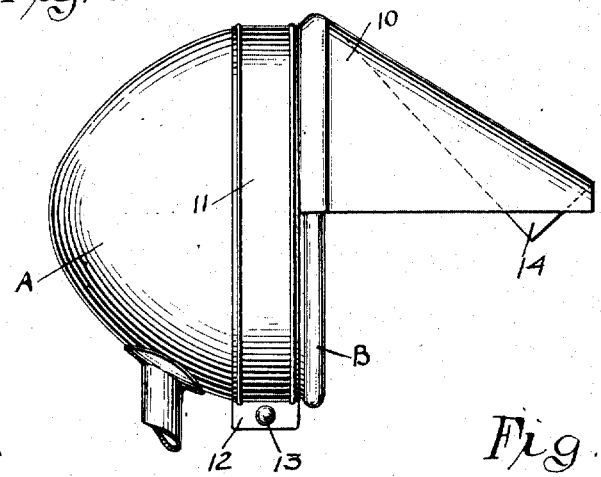
Figure 1, is a side elevation of a headlight with the shield applied.
Figure 2:
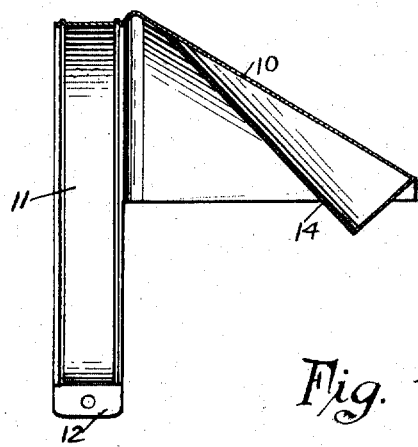
Fig. 2, is a longitudinal sectional view through the hood detached.
Figure 3:
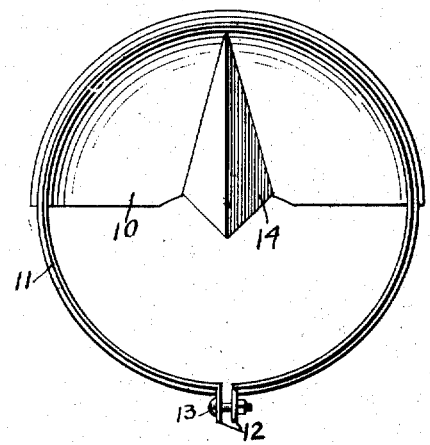
Fig. 3, is a rear elevation of the same.
Figure 4:
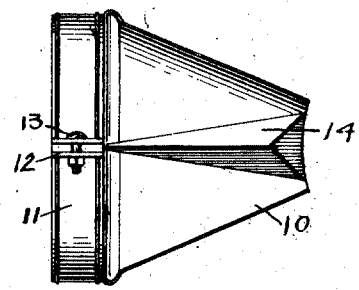
Fig. 4, is a bottom plan view thereof.

Referring to the drawings by characters of reference, A designates a headlight of ordinary construction which is provided with the enlarged bead B. The shield 10, which is of substantially semi frusto conical formation is secured to an attaching element or clamping member 11, which is of annular formation and is provided at its lower end with the outturned lips 12, which are apertured to receive the clamping bolt 13, in order to clamp the member 11, to the headlight immediately behind the bead B. The hood 10, embraces substantially one-half of the periphery of the lens of the headlight and is arranged at the upper portion thereof. Located centrally within the under portion of the hood is a substantially V shaped reflecting member 14, which co-acts with the under surface of the hood to scatter the light rays in a downward and outward direction from the sides thereof. The member 14, also serves as a strengthening rib for the hood and as shown in the drawing decreases toward the inner portion of the same. The inner surface of the hood and the member 14 are preferably mirrored or highly polished in order to provide a reflecting surface which will tend to augment or increase the light rays to appreciable extent.

While I have shown and described a simple and preferred form of the invention, I wish it understood that I do not care to be limited to the exact details of construction as therein exhibited but such changes and alterations as fall within the scope of the appended claim may be resorted to when desired.

What I claim is:

A shield for headlights comprising a hood, adapted to be secured thereto forwardly of the lens thereof, said hood being of substantially semi-frusto-conical formation and provided with side walls which terminate approximately on a line with the horizontal center of the lamp and means comprising angularly disposed faces located within the hood and co-acting therewith to cause the light rays to be projected in a downward and outward direction from the sides of the hood.

In testimony whereof I affix my signature.

SYLVESTER D. COREY.